United States Patent [19]
Leger et al.

[11] Patent Number: 5,765,023
[45] Date of Patent: Jun. 9, 1998

[54] DMA CONTROLLER HAVING MULTIPLE CHANNELS AND BUFFER POOL HAVING PLURALITY OF BUFFERS ACCESSIBLE TO EACH CHANNEL FOR BUFFERING DATA TRANSFERRED TO AND FROM HOST COMPUTER

[75] Inventors: Geary L. Leger, Fremont; Bhoopal R. Benjaram, Sunnyvale; Peter R. Carpenter, Watsonville; Gary L. Schaps, Fremont, all of Calif.; John Andrew Wishneusky, Bolton, Mass.

[73] Assignee: Cirrus Logic, Inc., Fremont, Calif.

[21] Appl. No.: 536,732

[22] Filed: Sep. 29, 1995

[51] Int. Cl.⁶ .................................................. G06F 15/40
[52] U.S. Cl. ................................................. 395/842
[58] Field of Search .................... 395/842, 250, 395/309, 800, 435–439, 497.01, 821, 822, 823, 824, 846, 841, 848, 872, 874

[56] References Cited

U.S. PATENT DOCUMENTS

| | | | |
|---|---|---|---|
| 4,956,771 | 9/1990 | Neustaedter | 395/872 |
| 5,289,583 | 2/1994 | Fischer et al. | 395/729 |
| 5,412,780 | 5/1995 | Rushton | 364/239 |
| 5,444,853 | 8/1995 | Lentz | 395/842 |
| 5,450,591 | 9/1995 | Palmer | 395/293 |
| 5,493,547 | 2/1996 | Zampini et al. | 369/48 |
| 5,493,652 | 2/1996 | Koufopavlou et al. | 711/170 |
| 5,606,559 | 2/1997 | Badger et al. | 370/395 |
| 5,655,151 | 8/1997 | Bowes et al. | 395/842 |
| 5,685,005 | 11/1997 | Garde et al. | 395/823 |

*Primary Examiner*—Moustafa M. Meky
*Attorney, Agent, or Firm*—Frank D. Nguyen; Lowe, Price, LeBlanc & Becker

[57] ABSTRACT

A method and arrangement for performing direct memory access in a computer system having multi-channel direct memory access (DMA) is provided with a host computer having a main memory and a processor that runs software, a system interface bus coupling the host computer and the main memory, and a multi-channel DMA controller arrangement coupled to the system interface bus and having multiple input/output (I/O) channels. A common buffer pool having a plurality of buffers is accessible to each of the multiple channels for buffering data transferred to or from the host computer. A status queue is also provided, with each entry in the status queue indicating whether a corresponding buffer from the common pool of buffers is a free buffer available for use by one of the DMA channels in a DMA transaction. The status queue is searched for an entry in the status queue which indicates whether its corresponding buffer is a free buffer, when a DMA transaction is to occur over one of the DMA channels. When a free buffer is found, the entry in the status queue and the free buffer are claimed by the DMA channel. The starting address of the free buffer is then determined and data is buffered within the free buffer.

32 Claims, 6 Drawing Sheets

DMA CONTROLLER HAVING MULTIPLE CHANNELS AND BUFFER POOL HAVING PLURALITY OF BUFFERS ACCESSIBLE TO EACH CHANNEL FOR BUFFERING DATA TRANSFERRED TO AND FROM HOST COMPUTER

RELATED APPLICATIONS

The present application is related to U.S. patent application Ser. No. 08/536,729, filed on Sep. 29, 1995, still pending.

FIELD OF THE INVENTION

The present invention relates to the field of data transfers in computer systems, and more particularly, to a central processing unit (CPU) controlled system that passes data over a CPU bus using a plurality of direct memory access (DMA) channels.

BACKGROUND OF THE INVENTION

In a digital computer, a CPU operates on data stored in a main memory. Since there are practical size limitations on the main memory, bulk memory storage devices are provided in addition to and separately from the main memory. When the CPU wants to make use of data stored in bulk storage, for example, a hard disk, the data is moved from the hard disk into the main memory. This movement of blocks of memory inside the computer is a very time consuming process and would severely hamper the performance of the computer system if the CPU were to control the memory transfers itself.

In order to relieve the CPU from the chore of controlling the movement of blocks of memory inside the computer, a direct memory access (DMA) controller is normally used. The DMA controller receives information from the CPU as to the base location from where bytes are to be moved, the address to where these bytes should go, and the number of bytes to move. Once it has been programmed by the CPU, the DMA controller oversees the transfer of the memory data within the computer system. Normally, DMA operations are used to move data between input/output (I/O) devices and memory. During the transfer, the data is temporarily stored in buffers.

There are at least two basic types of DMA buffer management schemes: circular queue and linked list. In circular queue, descriptors are maintained in a ring structure. In a linked list, a sequence of buffers is maintained connected one to another.

The LANCE chip architecture manufactured by Advanced Micro Devices of Sunnyvale, Calif. provides one example of circular queue DMA management. The 68605X.25 chip manufactured by Motorola of Schaumberg, Ill. is an example of a chip using the linked list method. Still another DMA buffer management method is that used by Cirrus Logic of Fremont, Calif. in their CD24xx product family, in which A/B buffering provides a double buffering mechanism.

All the above examples are methods of DMA buffer management for one channel. For example, each CD24xx chip has four full duplex channels. Thus, a CD24xx could have as many as eight DMA paths: four transmit and four receive. However, each transmit and receive DMA channel is provided with its own separate A/B buffering scheme. Thus, even though it has multiple channels, the CD24xx is an example of single channel DMA buffer management.

In modern systems, there are often many paths provided for data transfers to and from the system. Data transfers with the system may involve, for example: disk controllers, SCSI controllers, parallel data ports, LANs, and WANs. Hence, it is advantageous to provide a computer system with multiple communication channels. However, for those applications that need multiple communication channels, the provision of separate DMA buffering management for each channel is not efficient. A traditional single channel DMA approach for multiple channels causes excessive overhead for the host CPU. This is due in part to the separate pointers and control/status methods that are maintained for each channel.

There is therefore a need for a DMA controller arrangement that provides multiple channels without requiring excessive overhead to support the buffer management.

SUMMARY OF THE INVENTION

This and other needs are met by the present invention which provides a computer system having multi-channel direct memory access (DMA), comprising a host computer having a processor that runs software and a main memory, a system interface bus coupling the host computer and the main memory, and a multi-channel DMA controller arrangement coupled to the system interface bus. The DMA controller arrangement has multiple input/output (I/O) channels and a common buffer pool having a plurality of buffers accessible to each of the multiple channels for buffering data transferred to or from the host computer.

The provision of a computer system having a DMA controller arrangement with multiple I/O channels but a common buffer pool according to the present invention, permits the proper amount of buffers to be utilized as needed. For example, if more buffers are needed on a particular channel, they are available in the common buffer pool. The use of a common buffer pool also reduces the number of circular queues and pointers, since each channel does not need its own circular queue and pointer.

The earlier stated needs are also met by another aspect of the present invention which provides a method of performing direct memory access (DMA) in a system having a DMA controller arrangement with multiple DMA channels and a common pool of buffers. The method comprises the steps of maintaining a status queue, with each entry in the status queue indicating whether a corresponding buffer from the common pool of buffers is a free buffer available for use by one of the DMA channels in a DiA transaction. When a DMA transaction is to occur over one of the DMA channels, the status queue is searched for an entry which indicates whether its corresponding buffer is a free buffer. The entry in the status queue and the free buffer are claimed by the DMA channel when the entry in the status queue with the corresponding free buffer is found. A starting address of the free buffer is then determined, and data is then buffered within the free buffer.

The method of the present invention permits non-contiguous buffers. The ability to search for a free buffer allows multiple channels with different speeds to co-exist in the computer system without a slow channel completely foreclosing the use of the buffers by other channels. If a slower channel is currently filling up a number of buffers with data, there may be embedded free buffers in the common buffer pool that have been freed for use by the software. The searching feature of the present invention identifies such free buffers that are then claimed by other DMA channels for filling with data.

The foregoing and other features, aspects and advantages of the present invention will become more apparent from the

DETAILED DESCRIPTION OF AN ILLUSTRATIVE EMBODIMENT

Figure 1:
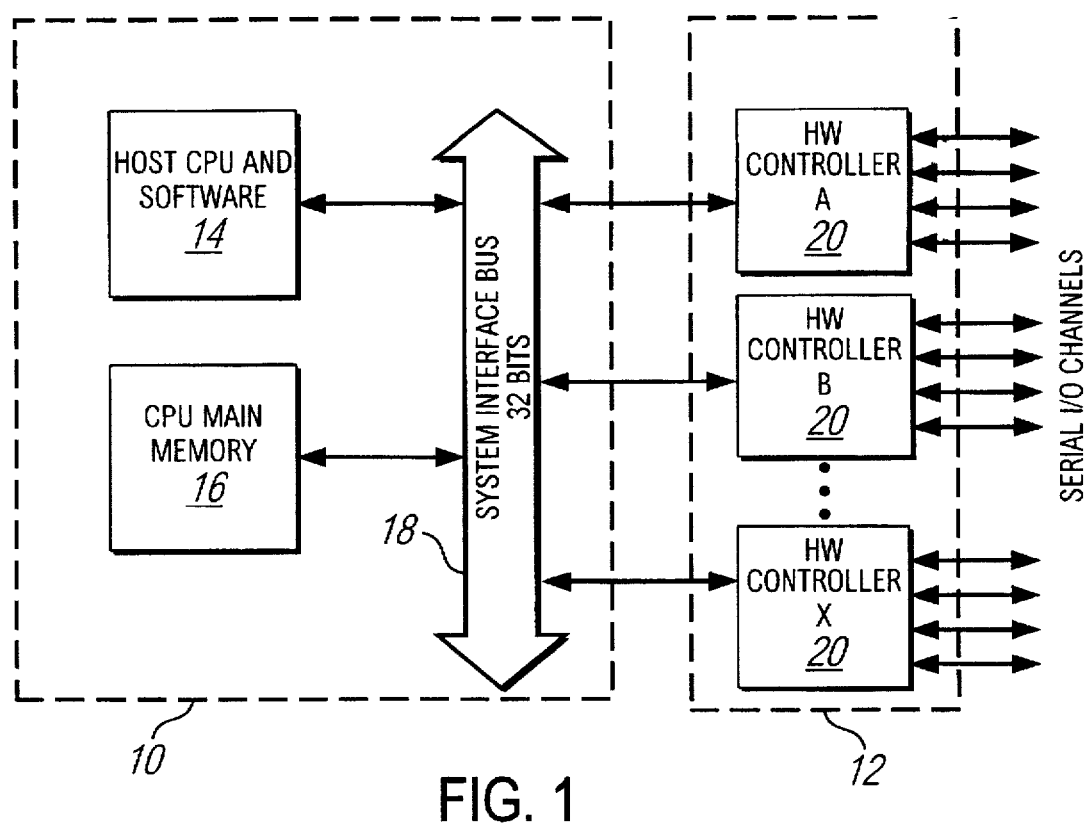
FIG. 1 is a block diagram of a computer system constructed in accordance with an embodiment of the present invention.

FIG. 1 is a block diagram of a computer system constructed in accordance with an embodiment of the present invention. The system comprises a host computer 10 coupled to a DMA controller arrangement 12. The host computer 10 includes a host central processing unit (CPU) 14 that operates as programmed by software, and a main (or host) memory 16 for the CPU 14. Both the CPU 14 and the main memory 16 are coupled to a system interface bus 18. The system interface bus 18 can be a peripheral component interconnect (PCI) bus, or a conventional 64K (32 bit) system interface, for example.

The DMA controller arrangement 12 has a plurality of DMA controllers 20 that provide multiple serial I/O channels of communication for direct memory access. In the embodiment of FIG. 1, each DMA controller 20 provides multiple channels, although other embodiments of the invention provide DMA controllers that have single channels. The multiple channels of the multiple DMA controllers 20 of the DMA controller arrangement 12 allow the computer system to interact with a plurality of different communication sources, such as disk controllers, SCSI controllers, parallel data ports, LANs, and WANs.

Although shown in FIG. 1 as having multiple DMA controllers 20, certain embodiments of the present invention have only a single DMA controller 20 (such as shown, for example in FIG. 8) that has multiple channels.

The following description of an exemplary embodiment is applied to multiple receivers of data. However, one of ordinary skill in the art will appreciate that the invention is applicable in a symmetrical fashion for multiple transmitters.

The software operated by the host CPU 14 is responsible for identifying each DMA controller 20. The identifications of the DMA controllers 20 in FIGS. 1 and 2 (A, B, X) are arbitrary from the point of view of the DMA controllers 20. It is preferred, however, that the software assigns a unique identification to each DMA controller 20 in the common buffer pool group. This identification is placed in a register in each DMA controller 20. The register may be an 8 bit register, for example.

Figure 2:
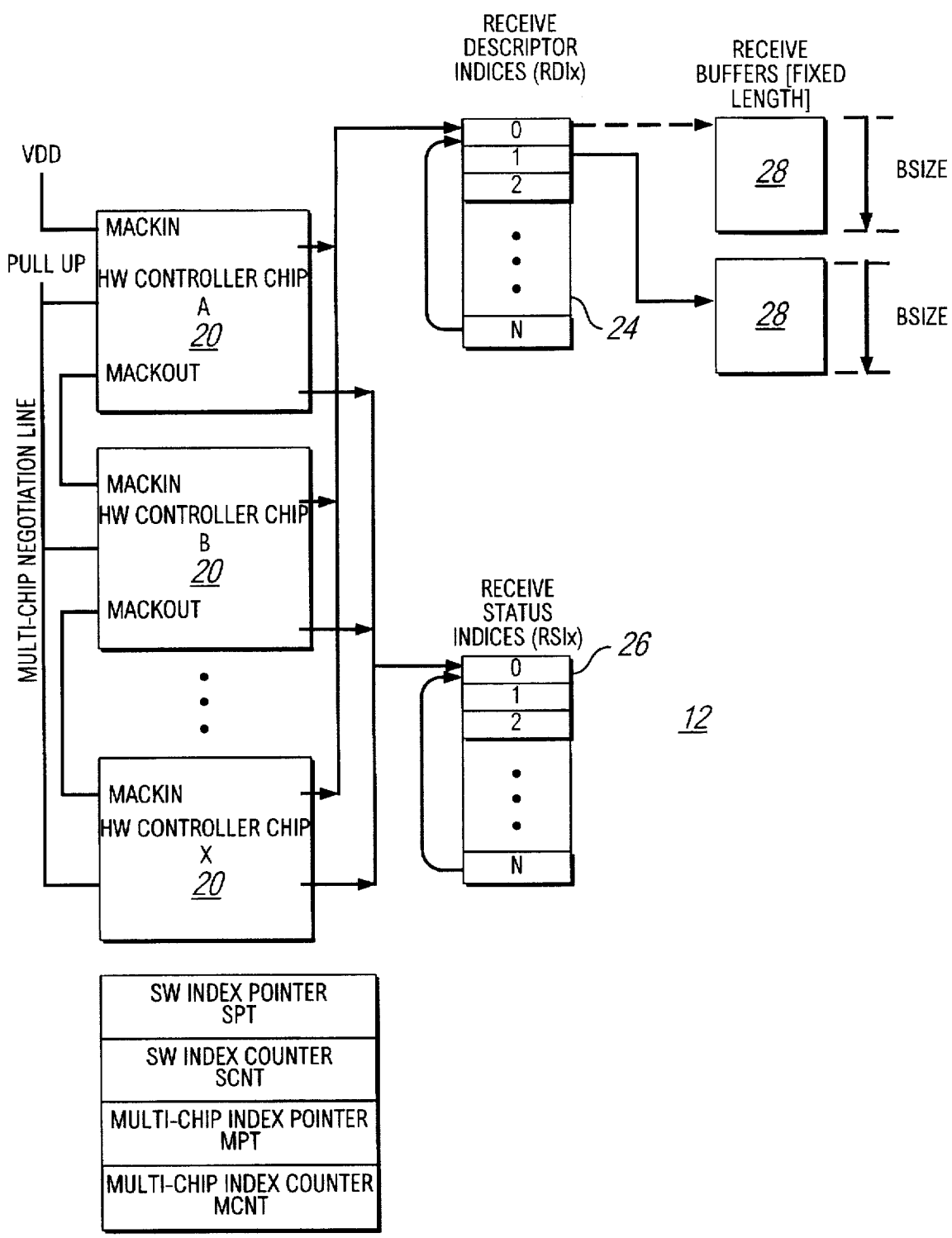
FIG. 2 is a block diagram of a DMA controller arrangement with a common buffer pool constructed in accordance with an embodiment of the present invention.

FIG. 2 is a more detailed block diagram of the DMA controller arrangement 12 with a common buffer pool constructed in accordance with an embodiment of the present invention. In addition to the multiple DMA controllers 20, the arrangement 12 includes a descriptor queue (RDIx) 24, and a status queue (RSIx) 26. Each queue 24, 26 has the same number of entries N as the number of buffers 28 that are initially available for use in receiving DMA transfers of data. The entries in the status queue 26 provide indications of the status of corresponding ones of the buffers 28, as will be described below. The entries in the descriptor queue 24 provide the starting address of the buffers 28.

Since the multiple DMA controllers 20 share the common buffer pool, the software must make certain that each DMA controller 20 in the daisy chain is programmed with the same start addresses for the descriptor queue 24 and status queue 26.

The length of the descriptor queue 24 and the length of the status queue 26 each represent the total number of entries, N. Both the descriptor queue 24 and the status queue 26 have the same N total entries, and the software makes certain that all DMA controllers 20 in the daisy chain of DMA controllers 20 sharing the common buffer pool are programmed with the same value of N. In certain alternative embodiments, however, the length of the descriptor queue 24 and the status queue 26 are different from each other.

The buffer size, Bsize, for received packets is fixed for all buffers 28 in the common buffer pool, although in other embodiments the buffer sizes may vary. The software programs all of the DMA controllers 20 in the daisy chain sharing the common buffer pool with the same Bsize value.

When one or more of the multiple DMA controllers 20 are not to be connected with a common buffer pool, as in certain embodiments, then each such DMA controller 20 is provided with its own descriptor queue and receive status queue.

In operation, the DMA controllers 20 never write into the descriptor queue 24. When a DMA controller 20 needs a buffer, that DMA controller 20 first looks at the status queue 26 to find a free buffer. Such a free buffer is indicated by the corresponding entry in the status queue 26. Once that DMA controller 20 finds a free entry, that DMA controller 20 (or channel within the DMA controller 20) immediately marks that entry as "in-use". If the first entry the DMA controller 20 examines is not free (in-use or complete), then the channel of the DMA controller 20 keeps searching for the next free entry/buffer. If that channel of the DMA controller 20 searches completely around the ring of status queue 26 and fails to find a free buffer, then that DMA controller 20 alerts the software and other DMA controllers 20 that the entire common buffer pool is not available.

In contrast to the descriptor queue 24, the DMA controllers 20 write and read the status queue 26. The software reads the status queue 26, and writes to the status queue 26 only for the purpose of clearing an entry, which marks the entry as free.

Each entry in the status queue has three possible entry status conditions: free, in-use, and complete. In certain embodiments, each entry in the status queue also provides information regarding chip and channel identification, received frame length, received frame error conditions if any, and end-of-frame and beginning-of-frame status for chaining purposes.

In order to distinguish three entry status conditions, at least two bits are required. In an exemplary embodiment, the free indication is provided when both bits are clear. Hence, the software can simply clear the entry in the status queue, and thereby indicate that the referenced buffer 28 is free. A single bit can indicate the in-use status, and another bit can indicate the complete status. The DMA controllers 20 should not allow both of these two bits to be set at the same time.

Figure 7:
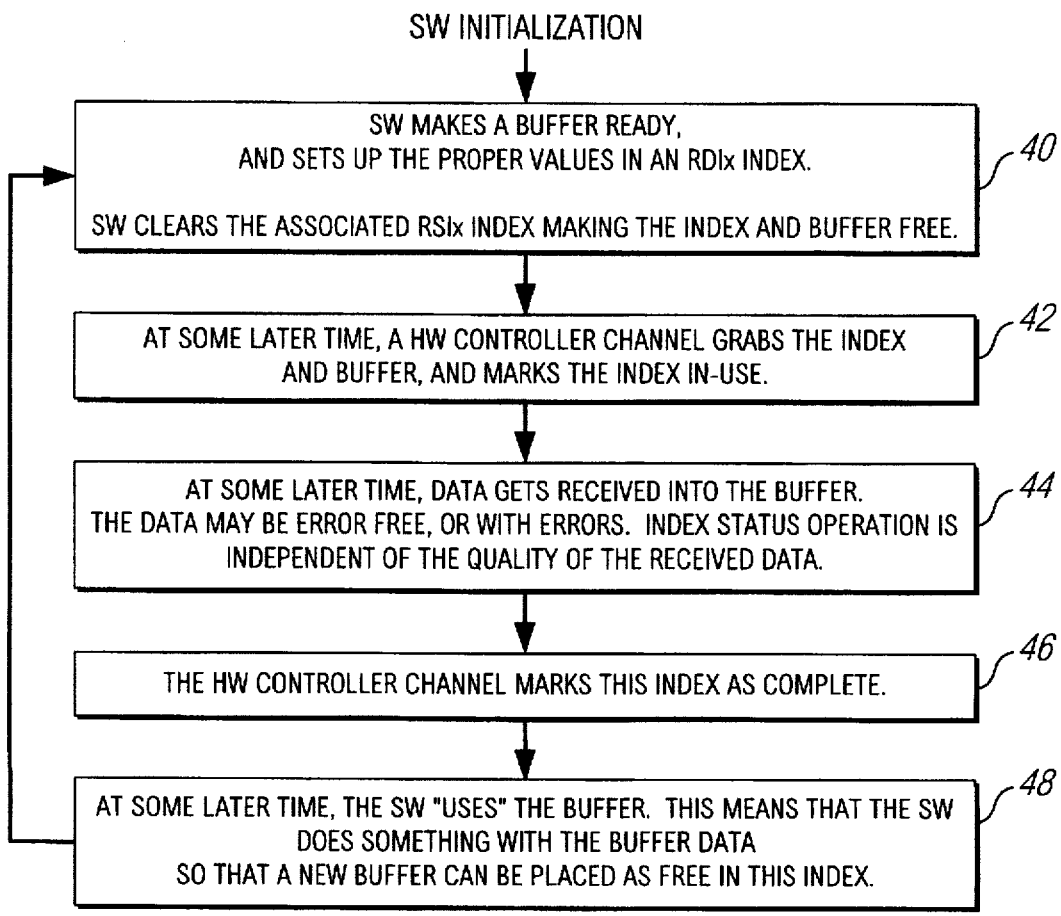
FIG. 7 is a flow chart of the operation of the status and descriptor queue according to an embodiment of the present invention.

FIG. 7 is a flow chart of the operation of the status and descriptor queues (26, 24) according to an embodiment of the present invention. After software initialization, the software in step 40 makes a buffer ready for data transfer, and stores the starting address for that buffer in an entry in the descriptor queue 24. The software also clears the associated entry in the status queue 26, marking the entry and the corresponding buffer 28 "free". This means that the entry and the corresponding buffer 28 are available for use by any channel.

In step 42, at some later time in operation, a DMA controller 20 claims the entry and corresponding buffer, and marks the entry "in-use". The in-use status indicates that a channel of a DMA controller 20 has claimed that entry in the status queue and the corresponding buffer. After the DMA controller 20 has found the free entry, and marked the same entry as "in-use", then that DMA controller 20 reads from the corresponding entry in the descriptor queue in the descriptor queue 24. The DMA controller 20 gets the start address of the free buffer from its reading of the entry in the descriptor queue.

Data is received in the buffer 28 in step 44. The data may be error free, or may contain errors. The entry status operation, however, is independent of the quality of the received data.

In step 46, the DMA controller 20 changes the entry in the status queue from "in-use" to "complete". Assume that a complete packet has been received, and that the packet length is equal to or less than the buffer size, Bsize. In this case the DMA controller 20 returns to the entry in the status queue 26, and writes this information into the entry in the status queue 26. The DMA controller 20 changes the status for that entry from "in-use" to "complete" as stated above. The complete status indicates that the channel of the DMA controller 20 has received a packet into the buffer 28, and that the channel is moving to another entry in the status queue 26 and corresponding buffer 28.

At a later point in time, the software will make use of the buffer data (step 48). A new buffer 28 is then indicated as free in the entry in the status queue 26 that had previously been marked as complete.

Returning to FIG. 2, the DMA controller arrangement also has a plurality of pointers and counters used in the management of the queues 24, 26. These include the software entry pointer SPt, the software buffer counter Scnt, the multi-chip entry pointer MPt, and the multi-chip buffer counter Mcnt. The counters are circular counters that are allowed to overflow. The counters are sufficiently large (e.g., 16 to 32 bits) so that there is no ambiguity. Whenever a DMA controller 20 channel claims a free buffer, that DMA controller 20 updates (increments) Mcnt by 1.

The counters Scnt, Mcnt are compared on a circular basis. This means that one counter could have an absolute value greater than the other counter, but actually be smaller on the circle. For example, assume that the counters are 16 bits long and that Mcnt has overflowed the 16 bit counter back to a value of 100. Also assume for this example that the Scnt has not yet overflowed the 16 bit counter, and is at a value of 63,000. In this case, Mcnt is ahead of Scnt even though the absolute values indicate Scnt as greater than Mcnt.

The multi-chip entry pointer MPt points to the next likely free buffer 28 in the common buffer pool so that the other DMA controllers 20 (or channels in embodiments having a single DMA controller) may begin their search for a free buffer at the next most likely free buffer. The multi-chip entry pointer MPt is updated by a DMA controller 20 before that DMA controller 20 is allowed to place received data into the buffer 28 that it had claimed. The DMA controller 20 writes the entry number of the entry it just found as free into MPt. This allows other DMA controllers 20 to start looking for the free buffer at the point where the last DMA controller 20 claimed the last entry. In other words, the next free entry is most likely to be at entry +1 from the number in MPt, and this is where the next DMA controller 20 will begin its search for a free buffer.

The software pointer SPt points to the next entry in the status queue 26 that the software is ready to process. The software pointer SPt is updated by the software upon each use of a buffer corresponding to an entry in the status queue 26.

In addition to updating the multi-chip entry pointer MPt prior to using the claimed buffer 28, the DMA controller 20 must also update the multi-chip buffer counter Mcnt by 1. The multi-chip buffer counter Mcnt keeps a count of the number of buffers 28 in the common buffer pool that have been claimed by one of the DMA controllers 20. As a function of this count and the count provided by the software counter Scnt, the total number of buffers available for use may be readily determined.

As the software uses the buffers 28 and queues 24 and 26, the software is responsible to update the software entry pointer (SPt) and the software buffer counter (Scnt). When the software uses a buffer 28, and has made the corresponding entry in the status queue ready with a new buffer 28, then the software clears the appropriate entry in the status queue 26, as described earlier. This marks that entry in the status queue 26 as free. The software will then increment the software buffer counter Scnt by 1. If the software entry pointer SPt moved, the software updates SPt. This is described in more detail later.

The difference count, Mcnt–Scnt, allows the number of free buffers to be readily determined. In other embodiments, however, only one counter is provided. This single counter is incremented by the DMA controllers 20 and decremented by the software, or vice versa. This alternative embodiment allows the number of free buffers to be read directly from the single counter.

An ambiguity exists when SPt=MPt. In this case, the status queue 26 and buffers 28 could be totally wrapped-around or totally free. The term "totally wrapped-around" does not necessarily mean that there are no free buffers. The ring could have totally wrapped-around, but there could be embedded free buffers. This ambiguity is eliminated by comparison of the counters Scnt and Mcnt, which reveals whether there are any free, embedded buffers.

All DMA controllers 20 require access to the SPt and MPt pointers, and the Scnt and Mcnt counters. Accordingly, in preferred embodiments, these pointers and counters reside in the main memory 16 outside the DMA controllers 20 as shown in FIG. 1. Alternatively, these pointers and counters could instead reside in one or more DMA controllers 20 with a method to share them among the DMA controller 20.

Figure 3:
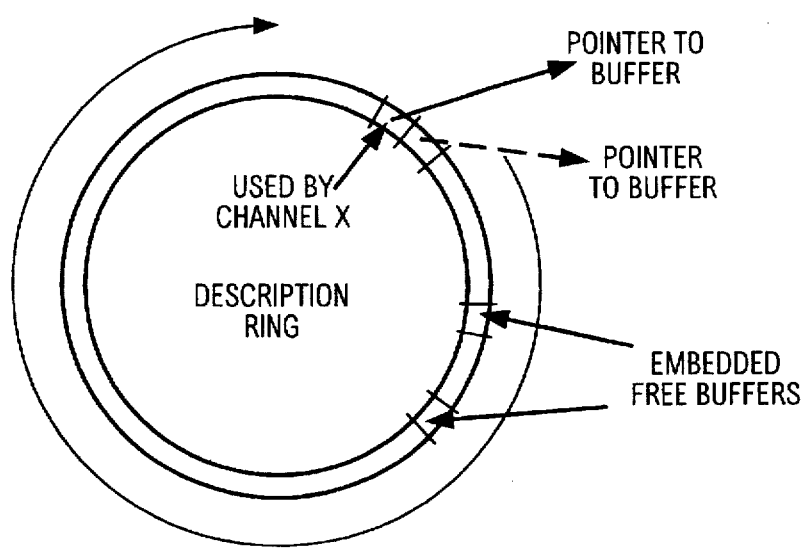
FIG. 3 is a schematic diagram of a descriptor queue ring.

When multiple channels share the DMA structure, there are special problems. In a single channel DMA receiver, each packet is received in sequence. The beginning and end of a packet completely precedes all subsequent packets. In other words, in any single channel DMA structure, the packet arrival for one channel is "packet sequence orderly". However, for multiple channels, packets arrive at different times. Thus, one descriptor segment may complete before some or all of its predecessors. Sequenced packet arrival is therefore not orderly. This problem is further exacerbated by the fact that different channels have different speeds (and protocols). In single channel descriptor ring architectures, the descriptors in a descriptor ring are kept contiguous. If the descriptors are kept contiguous in a multi-channel ring, then a slow channel could keep one descriptor segment busy while the rest of the ring looped back around. In this case, there would be free buffers available for use in a DMA transfer, but after the slow descriptor. In order to be efficient, therefore, the present invention provides for the re-use of embedded descriptors. Such embedded descriptors are depicted in FIG. 3, which is a schematic diagram of the receive descriptor queue 24 of FIG. 2, but in a ring form.

Assume that a multi-channel descriptor ring has "wrapped around" during operation. This means that the total number of packets collectively received by all channels is equal to the number of descriptors in the ring. Suppose that Channel X is rather slow (perhaps 1200 or 2400 bps while the other channels are 115.2 Kbps and higher up to 2 Mbps). During the time that those packets were received, the software used the information in some of the receive buffers. The software then freed those corresponding descriptors with associated buffers. However, if Channel X had a rather long and slow packet on its receiver,when the ring would be considered full when the ring wrapped around to the descriptor being used by Channel X. The DMA control arrangement described above permits "jumping over" used descriptors, and making use of ring embedded free buffers. Another way of stating this is that the present invention provides a DMA structure with non-contiguous buffers.

One of the advantages of non-contiguous buffers is that they allow full use of free buffers in the presence of multiple channels where packet arrival is highly varied from channel to channel. Also, non-contiguous buffers allow multiple buffers on the same channel for the same frame to be claimed.

The following is a description of the receive queue operation of the present invention. In this example, a single eight channel DMA controller arrangement is provided, with a common receive buffer pool. FIGS. 5A–E are schematic depictions of the status queue 26 (in the form of a ring for illustration purposes) during various stages of operation according to an embodiment of the present invention. At initialization (FIG. 5A), the software entry pointer SPt and the multi-chip entry pointer MPt both point to the start of the descriptor queue 24 and the status queue 26. The eight channels are identified as A through H. In this exemplary embodiment, the total number of descriptor queue 24 is 64 and the total number of status queue 26 is 64.

At immediate initialization, the counts Scnt and Mcnt are equal, and can be zero, for example. The pointers SPt and MPt both point to the head of the status queue 26 and the descriptor queue 24. Using the difference count between Scnt and Mcnt provides a significant advantage. These counters provide a fast method for the DMA controller 20 to determine the total number of free queue. The total size of the status queue 26, in segments, minus the difference count (Mcnt–Scnt) is equal to the number of free buffers/queue entries. The number of free buffers/queue entries is therefore given by the equation:

FREE_$B$=status queue size−(Mcnt−Scnt)

In preferred embodiments, the software ensures that all the buffers/queue entries are free at initialization, and updates the Scnt buffer counter each time a buffer/queue entry is made free. However, in other embodiments, the software need not keep an accurate update of the Scnt. The consequence of this is that the DMA controller 20 does not know how many buffers are available. The present invention is still operative, however, even without an accurate software buffer Scnt.

Figure 5A:
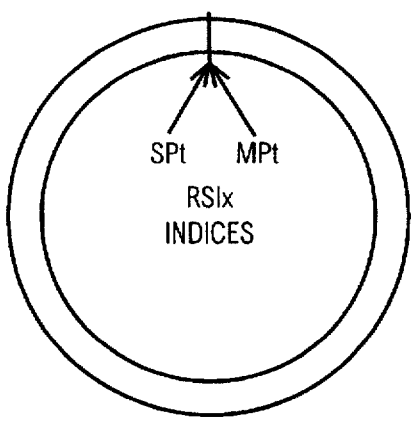
FIGS. 5A–E are schematic depictions of a status queue ring during various stages of operation according to an embodiment of the present invention.
Figure 5D:
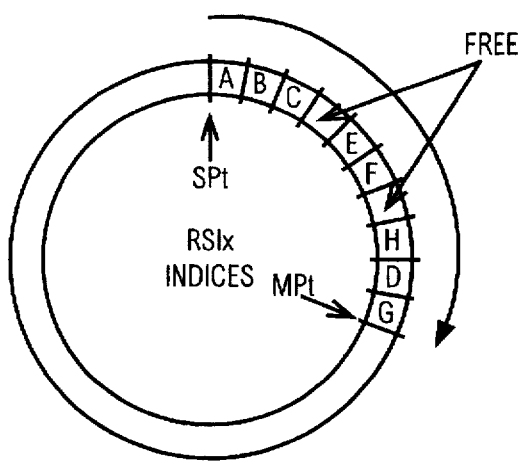
Figure 5B:
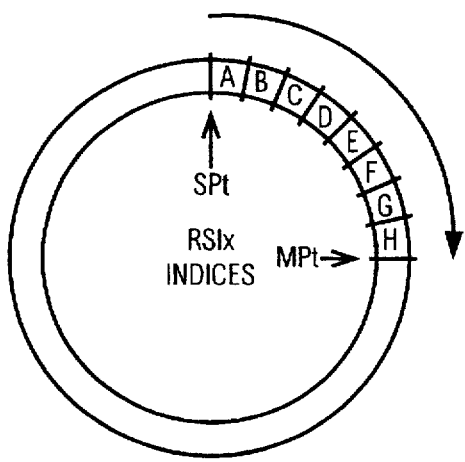

Continuing with the receive queue example, the eight channels are set up for receiving. This is depicted in FIG. 5B with the arbitrary assumption that the eight channels are set up with chip/channel identifications A through H. Each channel marks its entry in the status queue 26 as "in-use".

Figure 5E:
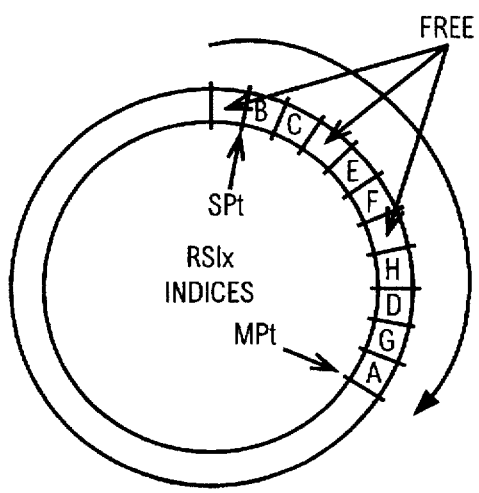
Figure 5C:
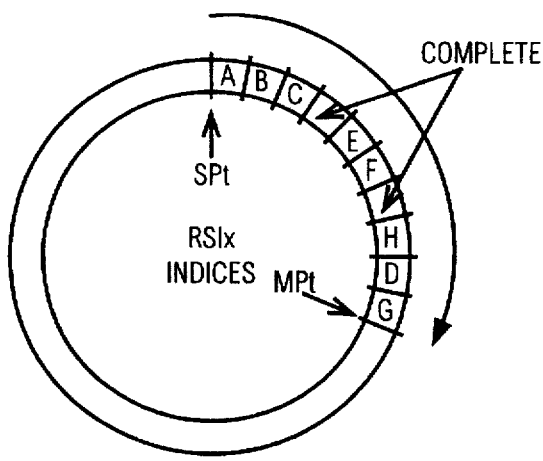

Assume that complete packets are received on channels D and G at approximately the same time. Then the previous buffers/queue entries used by D and G are made complete, and those channels search for new free buffers/queue (FIG. 5C). When the software eventually uses those two received buffers, the buffers/queue entries for D and G are then made free (FIG. 5D). Now assume that the packet on channel A is complete, and that the software has used that packet and makes the previous buffer/queue entry free (FIG. 5E).

This example of operation highlights some of the characteristics of the present invention. Immediately after initialization, the number of free buffers/queue entries is the total number of entries in the status queue 26 (or descriptor queue 24) less the total number of activated channels. Also, when the software has had a chance to use all of the received packets, the number of free buffers/queue entries is once again the total number of entries in the status queue 26 (or descriptor queue 24) less the total number of activated channels. Furthermore, the number of free buffers/queue entries decreases as packets are received and wait for the software to free that entry.

Since certain embodiments of the present invention provide multiple chips and multiple channels that share a common resource, in this case a common buffer pool, there needs to be some method of regulating the access to the pool by the multiple DMA controllers/channels. Certain preferred embodiments of the present invention provide for equal access among the DMA controllers/channels desiring use of the common buffer pool.

In the present invention, there are two levels of "mastership". The first is the normal bus mastership which a DMA controller 20 needs to obtain to perform transfers over the system interface bus 18. The second is the "right" to the descriptor and status queue 24, 26, the pointers MPt, SPt, and the counters Mcnt, Scnt over the other D-MA controllers 20. A DMA controller 20 performing data transfer to or from a buffer 28 does not need a right from other DMA controllers 20 to do so. For buffer data transfer, each DMA controller 20 appears as just another peripheral requesting DMA master access. For clarification purposes, the following terms, "DMA data access" and "DMA queue access", will be defined. "DMA data access" refers to an access for transferring receive data into a buffer 28, or transferring transmit data from a buffer 28. "DNA queue access" refers to an access to the queue (descriptor queue 24 and status queue 26) and the pointers/counters (SPt, MPt, Scnt, Mcnt). The term "access" itself means a memory read or write.

In the present invention, only one DMA controller 20 can attempt to gain DMA queue access at a time. To gain mastership of the host system interface bus 18 for DMA queue access, each DMA controller 20 must go through two steps. First, that DMA controller 20 must gain the right of bus mastership over all the other DMA controllers 20. Second, the DMA controller 20 must gain bus mastership through the normal request/grant procedure for bus master control access.

In preferred embodiments, when a DMA controller 20 wants DMA queue access right, that DMA controller 20 asserts a low signal on a negotiation line (MNLine in FIG. 2). If an acknowledge in (MAckIn) signal level is high, then that DMA controller 20 drives an acknowledge out (MAckOut) signal level low. The DMA controller 20 then temporarily has the sole right among other DMA controllers 20 for DMA mastership. When that DMA controller 20 finishes its DMA, it releases the MNLine and drives the acknowledge out (MAckOut) signal level high. That DMA controller 20 is not allowed to gain another DMA queue access right until MNLine line goes inactive (high) again.

Once a DMA controller 20 has the DMA right over all other DMA controllers 20, that DMA controller 20 may perform a series of DMA accesses. For example, that DMA controller 20 may need to update the current entry in the status queue 26, and then obtain the next available entry from the status queue 26. The DMA controller 20 then needs to set up the next receive buffer from the corresponding entry in the descriptor queue 24. That DMA controller 20 will most likely hold the DMA right from other DMA controllers 20 until these tasks are finished.

In other words, a DMA controller 20 according to certain embodiments of the present invention, gains the DMA right from other DMA controllers 20, then gains system interface bus mastership through the request/grant to update status queue 26. The DMA controller 20 would give up DMA mastership, but not the DMA right from other DMA controllers 20, to prepare to find the next available entry from status queue 26. The DMA controller 20 relinquishes mastership, and regains mastership to set up the next receive buffer. However, the DMA controller 20 does not necessarily relinquish the DMA queue access right.

In preferred embodiments, the DMA controllers 20 are only able to gain the right from other DMA controllers 20 one channel at a time. In other embodiments, however, exceptions are provided for certain programmed high priority channels so that a particular DMA controller 20 would obtain the DMA right for more than one channel at a time.

Figure 8:
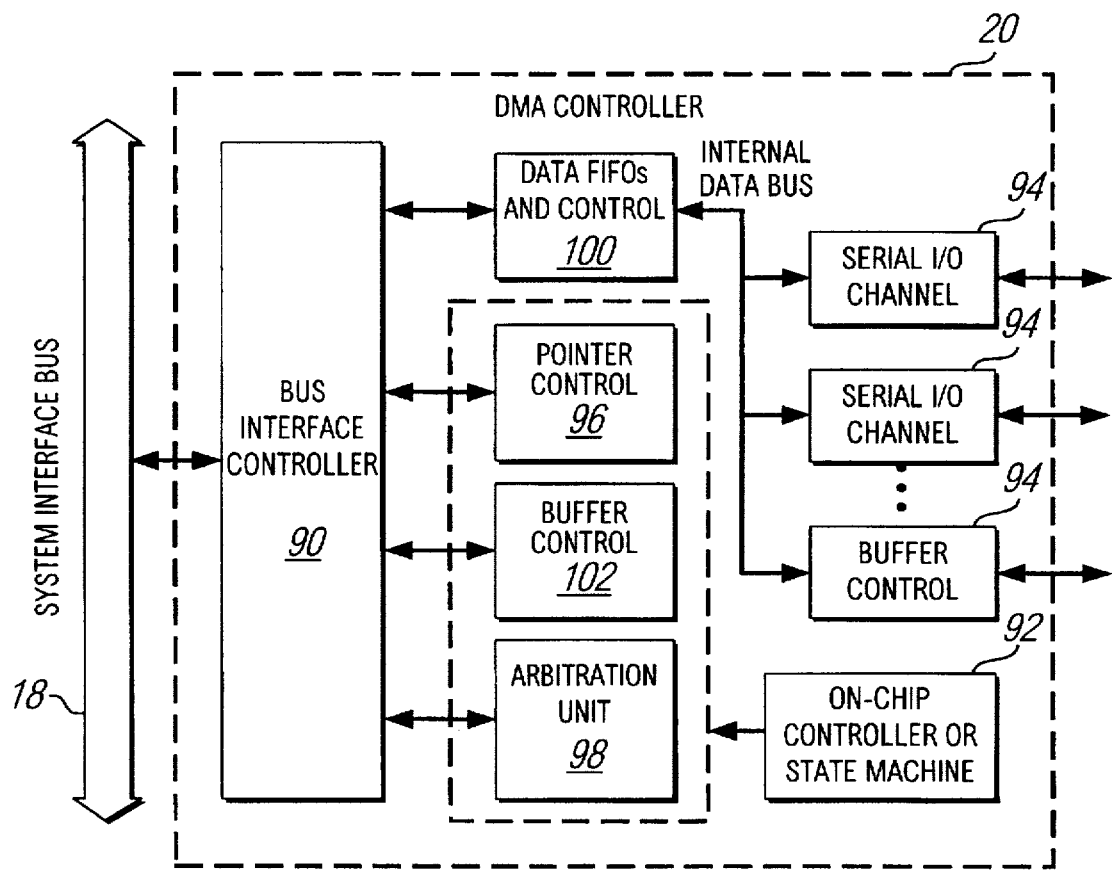
FIG. 8 is a block diagram of a DMA controller constructed in accordance with an embodiment of the present invention.

FIG. 8 is a block diagram of a DMA controller 20 constructed in accordance with an embodiment of the present invention. The DMA controller 20 is coupled to the system interface bus 18 by a bus interface controller 90. The DMA controller 20 has an on-chip controller or state machine 92. After initialization by the host CPU 14, the on-chip controller 92 selects a particular serial I/O (SIO) channel to prepare that SIO channel 94 to be ready to receive. The DMA controller 20 accesses the descriptor queue 24 using a pointer control 96 and an arbitration unit 98. The pointer control provides the control of the descriptor queue 24 and the status queue 26. The arbitration unit provides bus access arbitration, and channel and chip arbitration.

From the descriptor queue 24, the DMA controller 20 obtains the starting address for the receive buffer 28. A maximum buffer size, Bsize, will have been programmed into the on-chip controller 92 by the host CPU 14. After the DMA controller 20 has the starting buffer address and maximum buffer size, the particular SIO channel 94 selected is ready to place receive data into the host main memory 16 (FIG. 1).

The on-chip controller 92 repeats the above procedure to set up each SIO channel 94. The number of channels on the chip (DMA controller 20) may be any number, although certain preferred embodiments have eight channels.

To receive serial data, the selected SIO channel 94 first looks for a beginning of frame delimiter in the data stream. Frame delimiters are well known to those of skill in the art, and include flags and/or synchronization (SYN) characters. As serial data are received through an SIO channel 94, the data are converted to parallel (usually 8 bits per character), and place in a receive first-in, first-out (FIFO) buffer 100. The data FIFO and controller 100 move the received data through the FIFO to the bus interface controller 90. At this point, the arbitration unit 98 acquires bus mastership of the high speed bus through the bus interface controller 90. The FIFO data are then passed through the bus interface controller 90 and the system interface bus 18 to be written into the receive buffer 28 in main memory 16. The memory address pointer in a buffer control 102 is incremented to maintain the correct write location. The buffer control 102 increments a byte counter for each byte written to main memory 16.

The above procedure continues on the SIO channel 94 as data are received. Completion of a data frame is detected by a closing flag or other end of frame delimiter which is familiar to those of skill in the art of data communication formats and protocols. At the completion of the frame, the arbitration unit acquires the DMA right to access the status queue 26 from other channels and other DMA controller chips in those embodiments having multiple DMA controllers 20.

After gaining the DMA right, the arbitration unit then acquires bus mastership of the system interface bus 18, and writes the completed frame status into the appropriate entry of the status queue 26. In certain preferred embodiments, the frame status includes the total frame byte count (from the byte counter in the buffer control 102), a byte to indicate "good" or "error" received data, and other protocol specific information such as address matches, residual bit, or other types of information.

Using the pointer control 96, the arbitration unit 98 and the on-chip controller 92 then access the next available entry in the descriptor queue 24. From the descriptor queue 24, the DMA controller 20 obtains the start address for the receive buffer 28, and that particular SIO channel 94 is ready to write a new received frame into a new receive buffer 28.

Figure 4:
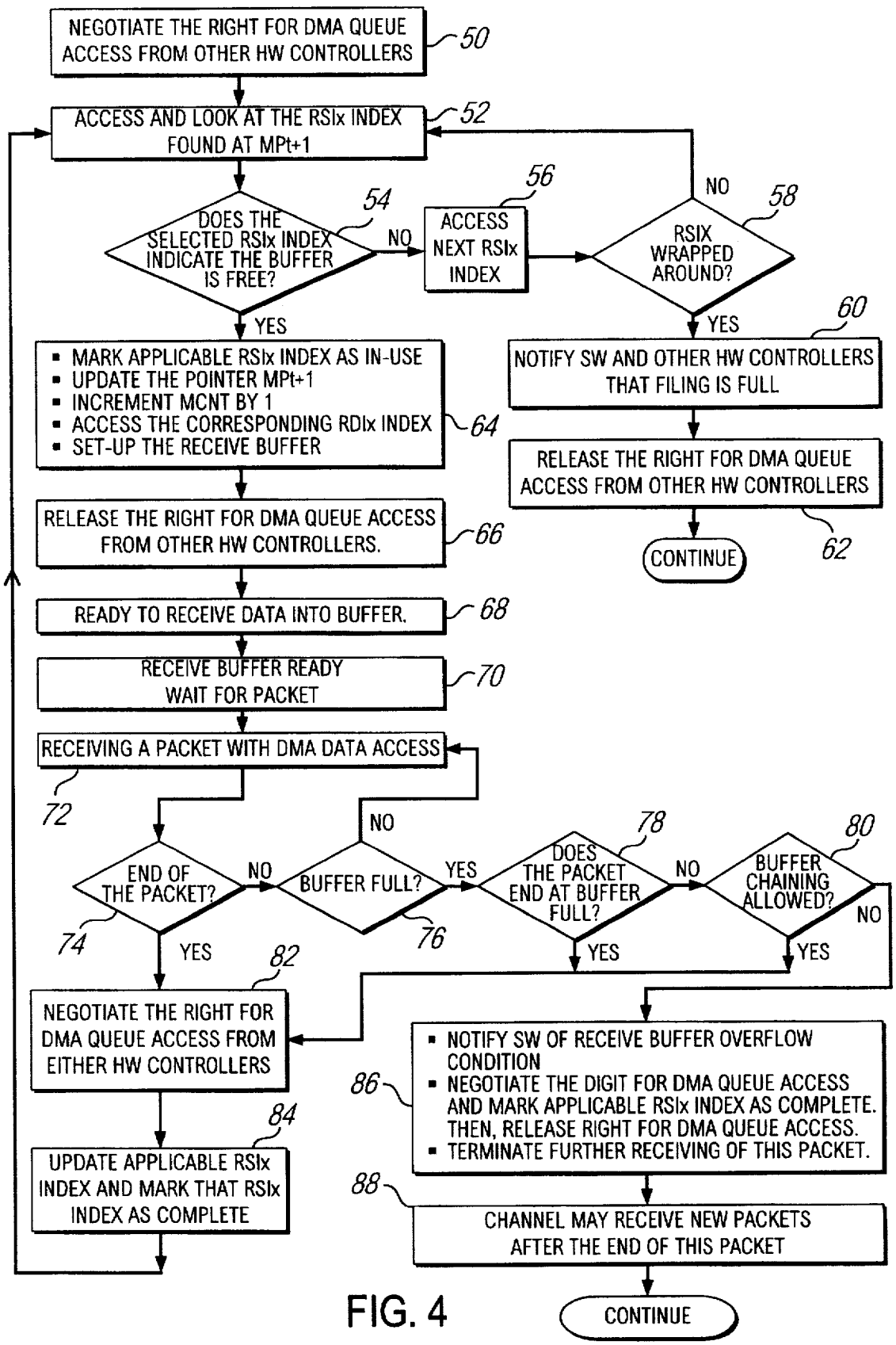
FIG. 4 is a flow chart of a buffer acquisition sequence and a buffer use and release sequence for a single channel in accordance with an embodiment of the present invention.

After having described above the present invention from a system point of view, FIG. 4 is a flow chart that explains the operation of the invention from the point of view of a single channel receiving a flow of data. This description applies to packet based data. The receipt of asynchronous (start-stop) data that may not have complete packets identified nor may not completely fill a buffer is only partially described.

There are three fundamental buffer operations that a receive channel must perform. These include: (1) acquire a buffer, (2) use the buffer, and (3) release the buffer.

In the first operation, the channel in a DMA controller 20 searches for a free buffer 28, marks that buffer 28 in the corresponding entry in the status queue as in-use, and prepares to receive data into that buffer 28. Buffer acquisition requires that the DMA controller 20 gain the DMA right from the other DMA controllers 20 as described earlier (for those embodiments having multiple DMA controllers 20).

In the second operation, that of using the buffer 28, a DMA controller 20 channel is not required to obtain the DMA right from other DMA controllers 20. Receive data are allowed to go into the buffer memory with normal bus request/grant procedures, and no additional right from other DMA controllers 20 is required.

In the third operation (releasing the buffer), the DMA controller 20 channel releases the descriptor queue 24 and status queue 26 and marks that buffer/queue entry as complete. Buffer release requires that the DMA controller 20 gain the DMA right from the other DMA controllers 20.

The flow chart of FIG. 4 describes these three basic operations in more detail. In step 50, a specific DMA controller 20 negotiates for the right for DMA queue access from other DMA controllers 20 that share the common buffer pool. In step 52, the DMA controller 20 accesses and examines the entry in the status queue pointed to by MPt +1, the multi-chip entry pointer plus one. If the buffer 28 corresponding to the entry in the status queue is not free, then the next entry in the status queue is examined in step 56.

It is next determined in step 58 whether the status queue 26 is wrapped-around, and if not, the next entry in the status queue is examined (step 52). If the set is wrapped-around, then the software and the other DMA controllers 20 are notified that the status queue 26 is full (step 60). The DMA controller 20 then releases the right for DMA queue access from the other DMA controllers 20 (step 62).

When the selected entry in the status queue is free, then (in step 64) the DMA controller marks the entry in the status queue as in-use, the pointer MPT +1 is updated, the Mcnt is incremented by 1, the corresponding entry in the descriptor queue 24 is accessed, and the receive buffer 28 is set up. The DMA controller 28 then releases the right for DMA queue access from other DMA controllers 20 in step 66. The DMA controller 20 prepares the buffer 28 to receive the data (step 68), the buffer 28 waits for the packet of data in step 70, and the buffer receives the packet with DMA data access in step 72.

The remaining steps in the flow chart of FIG. 4 relate to the flow of the buffer use and release. In step 74, it is determined whether the end of the packet of data has been reached. If not, then it is determined (step 76) whether the buffer is full. The receiving of data continues in step 72 if the buffer is not full and the end of the packet of data has not been reached. However, if the buffer is full, it is next determined whether the packet end coincides with the full buffer (step 78). If not, then it is determined whether buffer chaining is allowed (step 80).

When buffer chaining, which will be described later, is allowed, or the packet end coincides with the full buffer, then the DMA controller 20 negotiates for the right for DMA queue access from other DMA controllers 20, in step 82. The DMA controller 20 updates the entry in the status queue corresponding to the buffer 28 that was filled and marks the entry in the status queue as complete in step 84.

If the packet end did not coincide with the full buffer, and buffer chaining is not allowed, then in step 86 the DMA controller 20 notifies the software of a receive buffer overflow condition. It also negotiates for the right for DMA queue access and marks the corresponding entry in the status queue as complete, and then releases the right for DMA queue access. The DMA controller 20 then terminates further receiving of the data packet. The channel of the DMA controller 20 is then able to receive new packets after the end of the current data packet (step 88).

Certain preferred embodiments of the present invention permit chaining. The software may choose to use or not use chaining. Each DMA controller 20 has a designated control bit that specifically allows or disallows buffer chaining. If chaining is disallowed, and a packet is received that exceeds Bsize, then there is a buffer overflow, and that DMA controller 20 reports the overflow condition as one of the received frame error conditions.

Full packets received within one Bsize buffer have both beginning-of-frame (BOF) and end-of-frame (EOF) set in the appropriate status queue entry. If chaining is allowed, when a packet of greater length than Bsize is received, the DMA controller 20 marks the entry in the status queue as complete with BOF set and EOF clear. The DMA controller 20 then looks for another free buffer while the current frame is being received. Thus, in these embodiments, an adequate amount of FIFO buffering is allocated for chaining so that the DMA controller 20 can switch from one buffer to another while data are coming in on the receiver.

Each individual channel is selectable for use with chaining. In certain embodiments, the software globally selects all channels to allow chaining or disallow chaining. Alternatively, the software is able to individually select each channel for either chaining allowed or disallowed.

If another segment is received that fills a Bsize buffer, then the corresponding entry in the status queue 26 is marked as complete with both BOF and EOF clear. The last segment has BOF clear and EOF set. The total receive frame length is the sum of the receive lengths of all the chain segments. For software convenience, the DMA controller 20 keeps track of the total frame length, and places that value in the last entry for that frame.

Figure 6:
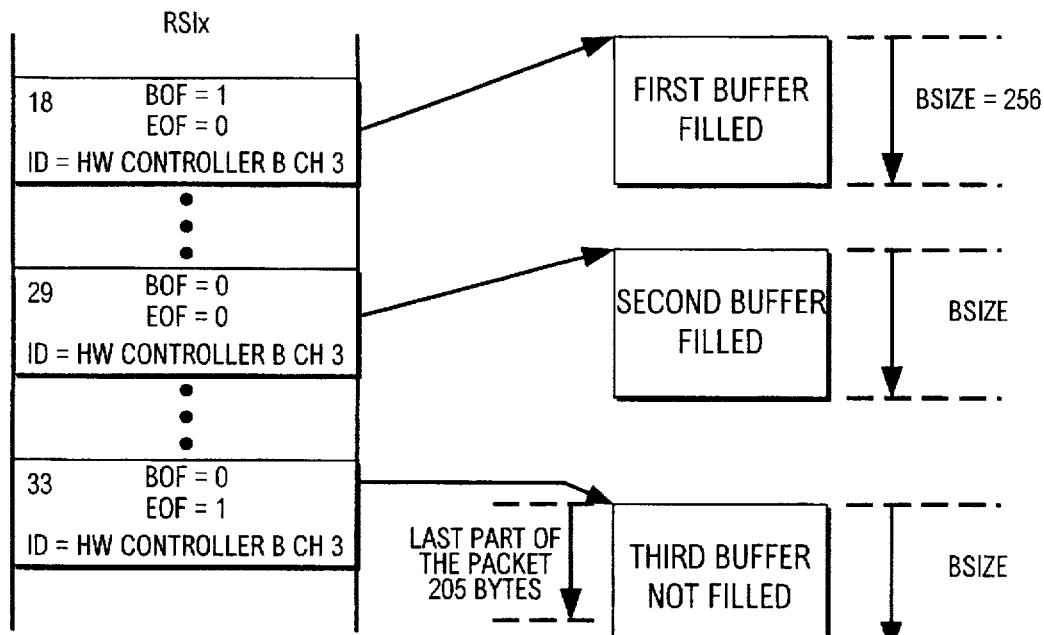
FIG. 6 is a schematic diagram of an example of chaining of buffers in accordance with an embodiment of the present invention.

FIG. 6 depicts an example of chaining according to an embodiment of the present invention. For this example, assume that a DMA controller 20 (designated B) has received a packet on channel 3. The packet is 717 bytes long, and the fixed Bsize is 256 bytes. Thus, the packet needs to be split into three parts as shown above. The first and second parts will each fill Bsize buffers of 256 bytes, and the third part will only partially fill a buffer with 205 bytes. 256+ 256+205=717 total bytes.

As this 717 byte packet is being received, DMA controller 20 (B) first sets up channel 3 to cause data to be received into the buffer corresponding to entry number 18 in the status queue 26. After filling the buffer corresponding to entry number 18, assume that the buffers corresponding to entry numbers 19 through 28 are taken by other DMA controllers 20 and/or channels. Thus, DMA controller 20 (B) then sets up channel 3 to continue receiving that packet into the buffer that corresponds to entry number 29 in the status queue 26. After this buffer is filled, assume that the buffers 30, 31, and 32 corresponding to entry numbers 30, 31 and 32 have been taken, so DMA controller 20 (B) sets up channel 3 to receive data into the buffer corresponding to entry number 33. After the last 205 bytes are received in this buffer, then the DYA controller 20 (B) reports the completion of the received packet, and writes the frame length into entry number 33 in the status queue 26. The software is responsible to sequentially trace the chained buffers in order to reconstruct the packet.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A computer system having multi-channel direct memory access (DMA), comprising:

a host computer having a processor that runs software and a main memory;

a system interface bus coupling the host computer and the main memory;

a multi-channel DMA controller arrangement coupled to the system interface bus and having multiple input/output (I/O) channels; and a common buffer pool having a plurality of buffers accessible to each of the multiple channels for buffering data transferred to or from the host computer.

2. The system of claim 1, further comprising a status queue having a plurality of entries, with each entry in the status queue corresponding to a different one of the plurality of buffers and providing an indication as to whether the corresponding buffer is a free buffer available for use by one of the channels.

3. The system of claim 2, wherein entries for free buffers are non-contiguous entries within the status queue such that free buffer entries embedded in the status queue are identifiable and available for use by one of the channels.

4. The system of claim 3, wherein the DMA controller arrangement includes a controller mechanism for writing an in-use status in an entry in the status queue when one of the channels has claimed the entry in the status queue and the free buffer corresponding to the claimed entry in the status queue, the in-use status preventing other channels from claiming the entry in the status queue and the corresponding buffer.

5. The system of claim 4, wherein the DMA controller arrangement further includes a controller mechanism for writing a complete status in an entry in the status queue when the channel has received a packet of data in the corresponding buffer.

6. The system of claim 5, wherein the host computer includes a controller mechanism for clearing an entry in the status queue to make the entry in the status queue and the corresponding buffer available for use by one of the channels.

7. A computer system having multi-channel direct memory access (DMA), comprising:

a host computer having a processor that runs software and a main memory connected to the processor for storing the software;

a system interface bus coupling the host computer and the main memory;

a multi-channel DMA controller arrangement coupled to the system interface bus and having multiple input/output (I/O) channels; and a common buffer pool having a plurality of buffers accessible to each of the multiple channels for buffering data transferred to or from the host computer, and further comprising:

a status Queue having a plurality of entries, with each entry in the status queue corresponding to a different one of the plurality of buffers and providing an indication as to whether the corresponding buffer is a free buffer available for use by one of the channels, wherein entries for free buffers are non-contiguous entries within the status queue such that embedded free buffer entries in the status queue are identifiable and available for use by one of the channels, and wherein the DMA controller arrangement includes a controller mechanism for writing an in-use status in an entry in the status queue when one of the channels has claimed the entry in the status queue and the free buffer corresponding to the claimed entry in the status queue, the in-use status preventing other channels from claiming the entry in the status queue and the corresponding buffer, and wherein the DMA controller arrangement further includes a controller mechanism for writing a complete status in an entry in the status queue when the channel has received a packet of data in a corresponding buffer, and wherein the host computer includes a process for clearing an entry in the status queue to make the entry in the status queue and the corresponding buffer available for use by one of the channels, further comprising:

a counting arrangement that maintains a count of the number of entries in the status queue that have been written with either an in-use status or a complete status and a count of the number of entries in the status queue that have been cleared.

8. The system of claim 7, further comprising a controller mechanism for determining the number of free buffers as a function of said counts.

9. The system of claim 4, further comprising a pointer that points to the entry in the status queue of a next likely free buffer, the DMA controller arrangement including a controller mechanism for examining the entry in the status queue pointed to by the pointer when searching for a free buffer; and updating the pointer after claiming a free buffer.

10. The system of claim 2, further comprising a descriptor queue, with each entry in the descriptor queue in the set corresponding to a different one of the plurality of buffers and providing a starting address of the corresponding buffer.

11. The system of claim 10, wherein the status queue and the descriptor queue correspond to the same buffers such that the DMA controller arrangement includes a controller mechanism for examining the status queue to identify a free buffer and obtaining the starting address or the free buffer from the descriptor queue.

12. A method of performing direct memory access (DMA) in a system having a DMA controller arrangement with multiple DMA channels and a common pool of buffers, comprising:

maintaining a status queue, with each entry in the status queue indicating whether a corresponding buffer from the common pool of buffers is a free buffer available for use by one of the DMA channels in a DMA transaction;

searching in the status queue for an entry which indicates its corresponding buffer is a free buffer, when a DMA transaction is to occur over one of the DMA channels;

claiming the entry in the status queue and the free buffer with the DMA channel when the entry in the status queue with the corresponding free buffer is found;

determining a starting address of the free buffer; and buffering data within the free buffer.

13. The method of claim 12, further comprising arbitrating among the DMA channels for a right to access the status queue and claim a free buffer.

14. The method of claim 13, further comprising preventing a DMA channel that has been granted the right from obtaining the right again until after the other DMA channels have had an opportunity to obtain the right.

15. The method of claim 14, wherein the step of maintaining the status queue includes writing an in-use status in an entry in the status queue when one of the DMA channels has claimed the entry in the status queue and the free buffer corresponding to the claimed entry in the status queue, the in-use status preventing other DMA channels from claiming the entry in the status queue and the corresponding buffer.

16. The method of claim 15, wherein the step of maintaining the status queue includes writing a complete status in an entry in the status queue when the DMA channel has received a packet of data in the corresponding buffer.

17. The method of claim 16, wherein the step of maintaining includes clearing an entry in the status queue to make the entry in the status queue and the corresponding buffer available for use by one of the DMA channels.

18. A method of performing direct memory access (DMA) in a system having a DMA controller arrangement with multiple DMA channels and a common pool of buffers, comprising:

maintaining a status queue, with each entry in the status queue indicating whether a corresponding buffer from the common pool of buffers is a free buffer available for use by one of the DMA channels in a DMA transaction;

searching in the status queue for an entry which indicates its corresponding buffer is a free buffer, when a DMA transaction is to occur over one of the DMA channels;

claiming the entry in the status queue and the free buffer with the DMA channel when the entry in the status queue with the corresponding free buffer is found;

determining a starting address of the free buffer; and buffering data within the free buffer, arbitrating among the DMA channels for a right to access the status queue and claim a free buffer, preventing a DMA channel that has been granted the right from obtaining the right again until after the other DMA channels have had an opportunity to obtain the right, wherein the step of maintaining the status queue includes writing an in-use status in an entry in the status queue when one of the DMA channels has claimed the entry in the status queue and the free buffer corresponding to the claimed entry in the status queue, the in-use status preventing other DMA channels from claiming the entry in the status queue and the corresponding buffer, wherein the step of maintaining the status queue includes writing a complete status in an entry in the status queue when the DMA channel has received a packet of data in the corresponding buffer, wherein the step of maintaining includes clearing an entry in the status queue to make the entry in the status queue and the corresponding buffer available for use by one of the DMA channels, and maintaining a count of the number of entries in the status queue that have been written with either an in-use status or a complete status and a count of the number of entries in the status queue that have been cleared.

19. The method of claim 18, further comprising determining the number of free buffers as a function of said counts.

20. The method of claim 17, further comprising maintaining a pointer that points to the entry in the status queue of a next likely free buffer, examining the entry in the status queue pointed to by the pointer when searching for a free buffer, and updating the pointer after claiming a free buffer.

21. The method of claim 20, further comprising maintaining a descriptor queue, with each entry in the descriptor queue corresponding to a different one of the plurality of buffers and providing a starting address of the corresponding buffer.

22. The method of claim 21, wherein the status queue and the descriptor queue correspond to the same buffers, and the step of determining the starting address includes examining the status queue to identify a free buffer and obtaining the starting address of the free buffer from the descriptor queue.

23. A multi-channel direct memory access (DMA) controller arrangement that controls DMA with a host computer, comprising:

a multi-channel DMA controller arrangement having multiple input/output (I/O) channels; and a common buffer pool having a plurality of buffers accessible to each of the multiple channels for buffering data transferred to or from the host computer.

24. The DMA controller arrangement of claim 23, further comprising a status queue, with each entry in the status queue corresponding to a different one of the plurality of buffers and providing an indication as to whether the corresponding buffer is a free buffer available for use by one of the channels.

25. The DMA controller arrangement of claim 24, wherein entries for free buffers are non-contiguous entries within the status queue such that embedded free buffer entries in the status queue are identifiable and available for use by one of the channels.

26. The DMA controller arrangement of claim 25, wherein the DMA controller arrangement includes a controller mechanism for writing an in-use status in an entry in the status queue when one of the channels has claimed the entry in the status queue and the free buffer corresponding to the claimed entry in the status queue, the in-use status preventing other channels from claiming the entry in the status queue and the corresponding buffer.

27. The DMA controller arrangement of claim 26, wherein the controller mechanism writes a complete status in an entry in the status queue when the channel has received a packet of data in the corresponding buffer.

28. A multi-channel direct memory access (DMA) controller arrangement that controls DMA with a host computer, comprising:

a multi-channel DMA controller arrangement having multiple input/out-out (I/O) channels; and a common buffer pool having a plurality of buffers accessible to each of the multiple channels for buffering data transferred to or from the host computer, further comprising:

a status queue, with each entry in the status queue corresponding to a different one of the plurality of buffers and providing an indication as to whether the corresponding buffer is a free buffer available for use by one of the channels, wherein entries for free buffers are non-contiguous entries within the status queue such that embedded free buffer entries in the status queue are identifiable and available for use by one of the channels, wherein the DMA controller arrangement includes a controller mechanism for writing an in-use status in an entry in the status queue when one of the channels has claimed the entry in the status queue and the free buffer corresponding to the claimed entry in the status queue, the in-use status preventing other channels from claiming the entry in the status queue and the corresponding buffer, and wherein the controller mechanism writes a complete status in an entry in the status queue when the channel has received a packet of data in the corresponding buffer, and a counting arrangement that maintains a count of the number of entries in the status queue that have been written with either an in-use status or a complete status and a count of the number of entries in the status queue that have been cleared.

29. The DMA controller arrangement of claim 28, further comprising the controller mechanism determines the number of free buffers as a function of said counts.

30. The DMA controller arrangement of claim 29, further comprising a pointer that points to the entry in the status queue of a next likely free buffer, in which the controller mechanism examines the entry in the status queue pointed to by the pointer when searching for a free buffer, and updating the pointer after claiming a free buffer.

31. The DMA controller arrangement of claim 30, further comprising a descriptor queue, with each entry in the descriptor queue corresponding to a different one of the plurality of buffers and providing a starting address of the corresponding buffer.

32. The DMA controller arrangement of claim 31, wherein the status queue and the descriptor queue correspond to the same buffers such that the controller mechanism examines the status queue to identify a free buffer and obtaining the starting address of the free buffer from the descriptor queue.

* * * * *